(12) United States Patent
Sugimoto et al.

(10) Patent No.: US 7,896,388 B2
(45) Date of Patent: Mar. 1, 2011

(54) SEAT AIRBAG

(75) Inventors: Shinichi Sugimoto, Tokyo (JP);
Akifumi Takedomi, Tokyo (JP)

(73) Assignee: Takata Corporation, Tokyo (JP)

( * ) Notice: Subject to any disclaimer, the term of this patent is extended or adjusted under 35 U.S.C. 154(b) by 283 days.

(21) Appl. No.: 12/160,765

(22) PCT Filed: Oct. 16, 2006

(86) PCT No.: PCT/JP2006/320595
§ 371 (c)(1),
(2), (4) Date: Jul. 11, 2008

(87) PCT Pub. No.: WO2007/080683
PCT Pub. Date: Jul. 19, 2007

(65) Prior Publication Data
US 2010/0164204 A1    Jul. 1, 2010

(30) Foreign Application Priority Data
Jan. 11, 2006    (JP)    ............... 2006-003292

(51) Int. Cl.
*B60R 21/207* (2006.01)
(52) U.S. Cl. ............... 280/730.2; 280/728.3
(58) Field of Classification Search ............. 280/730.2, 280/728.3
See application file for complete search history.

(56) References Cited

U.S. PATENT DOCUMENTS

| | | | | |
|---|---|---|---|---|
| 3,510,150 A | * | 5/1970 | Wilfert | 280/733 |
| 4,946,191 A | * | 8/1990 | Putsch | 280/730.2 |
| 5,062,663 A | * | 11/1991 | Satoh | 280/728.3 |
| 5,069,477 A | * | 12/1991 | Shiraki | 280/732 |
| 5,082,310 A | * | 1/1992 | Bauer | 280/732 |
| 5,108,128 A | * | 4/1992 | Parker et al. | 280/732 |

(Continued)

FOREIGN PATENT DOCUMENTS

DE    196 15 096 A1    9/1996

(Continued)

OTHER PUBLICATIONS

An International Search Report dated Jan. 11, 2007, from the International Bureau in corresponding International (PCT) Application No. PCT/JP2006/320595.

(Continued)

*Primary Examiner*—Paul N Dickson
*Assistant Examiner*—Nicole Verley
(74) *Attorney, Agent, or Firm*—Fitch, Even, Tabin & Flannery

(57) ABSTRACT

To provide a seat that enhances the stability and expansion speed with respect to the inflation expansion performance of airbag unit disposed thereinside. In one form, a seat is provided comprising a backrest part covered at its entirety with top fabric material and, at a given region of the top fabric material, it is furnished with tear line; an airbag constituted of a bag consisting of two basis fabrics joined together and disposed within the backrest part so as to at the time of inflation, cleave the tear line and expand over the head of driver or passenger; and reinforcing fabric disposed on the top fabric material so as to inhibit any cleavage of the top fabric material at regions other than the tear line.

3 Claims, 6 Drawing Sheets

U.S. PATENT DOCUMENTS

| | | | | |
|---|---|---|---|---|
| 5,125,683 | A * | 6/1992 | Nakajima | 280/731 |
| 5,154,444 | A * | 10/1992 | Nelson | 280/732 |
| 5,639,111 | A * | 6/1997 | Spencer et al. | 280/728.2 |
| 5,718,450 | A * | 2/1998 | Hurford et al. | 280/730.2 |
| 5,782,529 | A | 7/1998 | Miller, III et al. | |
| 5,863,063 | A * | 1/1999 | Harrell | 280/730.2 |
| 5,882,033 | A * | 3/1999 | Lachat | 280/728.3 |
| 5,899,528 | A * | 5/1999 | Rumpf et al. | 297/216.13 |
| 5,967,546 | A * | 10/1999 | Homier et al. | 280/730.2 |
| 6,003,938 | A * | 12/1999 | Lachat et al. | 297/216.13 |
| 6,074,003 | A * | 6/2000 | Umezawa et al. | 297/216.1 |
| 6,199,900 | B1 | 3/2001 | Zeigler | 280/735 |
| 6,293,580 | B1 * | 9/2001 | Lachat et al. | 280/728.3 |
| 6,805,404 | B1 * | 10/2004 | Breed | 297/216.12 |
| 7,004,496 | B2 * | 2/2006 | Bossecker et al. | 280/730.2 |
| 7,134,686 | B2 * | 11/2006 | Tracht et al. | 280/730.2 |
| 7,232,150 | B2 * | 6/2007 | Nagayama | 280/730.2 |
| 7,281,735 | B2 * | 10/2007 | Acker et al. | 280/730.2 |
| 7,318,601 | B2 * | 1/2008 | Sugimoto et al. | 280/730.1 |
| 7,341,275 | B2 * | 3/2008 | Miyake et al. | 280/730.2 |
| 7,380,812 | B2 * | 6/2008 | Tracht et al. | 280/728.3 |
| 7,390,015 | B2 * | 6/2008 | Tracht | 280/728.3 |
| 7,425,018 | B2 * | 9/2008 | Suwama et al. | 280/728.3 |
| 7,448,643 | B2 * | 11/2008 | Kuettner et al. | 280/728.3 |
| 7,458,603 | B2 * | 12/2008 | Buono et al. | 280/728.2 |
| 7,469,922 | B2 * | 12/2008 | Kino et al. | 280/729 |
| 7,549,669 | B2 * | 6/2009 | Keshavaraj | 280/729 |
| 7,552,940 | B2 * | 6/2009 | Lindemann et al. | 280/730.2 |
| 7,556,285 | B1 * | 7/2009 | Hayashi | 280/728.3 |
| 7,669,889 | B1 * | 3/2010 | Gorman et al. | 280/730.2 |
| 7,681,910 | B2 * | 3/2010 | Wieczorek et al. | 280/730.2 |
| 2001/0009327 | A1 * | 7/2001 | Zeigler | 280/735 |
| 2002/0130495 | A1 * | 9/2002 | Lotspih et al. | 280/730.2 |
| 2004/0126532 | A1 * | 7/2004 | Gardner, Jr. | 428/43 |
| 2005/0104338 | A1 * | 5/2005 | Soderquist | 280/728.3 |
| 2005/0225062 | A1 * | 10/2005 | Dumbrique | 280/728.3 |
| 2005/0258624 | A1 * | 11/2005 | Abraham et al. | 280/728.3 |
| 2005/0269804 | A1 * | 12/2005 | Yamada et al. | 280/728.3 |
| 2006/0033313 | A1 * | 2/2006 | Horiyama | 280/728.3 |
| 2006/0113764 | A1 * | 6/2006 | Tracht | 280/730.2 |
| 2007/0138769 | A1 * | 6/2007 | Miwa et al. | 280/728.2 |

FOREIGN PATENT DOCUMENTS

| | | |
|---|---|---|
| DE | 196 14 314 A1 | 10/1996 |
| JP | 10 053089 | 2/1998 |
| JP | 11 091488 | 4/1999 |
| JP | 11 129856 | 5/1999 |
| JP | 2002 037011 | 2/2002 |
| JP | 2002 145003 | 5/2002 |
| JP | 2004 276906 | 10/2004 |

OTHER PUBLICATIONS

English translation of the International Preliminary Report on Patentability (Chapter I of the Patent Cooperation Treaty) from the International Bureau for International Application No. PCT/JP2006/320595 dated Jul. 24, 2008, 6 pages.

* cited by examiner

SEAT AIRBAG

CROSS-REFERENCE TO RELATED APPLICATIONS

This is a US national phase application of PCT/JP2006/320595, filed Oct. 16, 2006, which claims priority from Japanese Application No. 2006-003292, filed Jan. 11, 2006, which is hereby incorporated herein by reference in its entirety.

TECHNICAL FIELD

The present invention relates to a seat mounted to a vehicle, such as an automobile, and including an airbag in its interior.

BACKGROUND ART

Hitherto, various airbag devices, such as a driver airbag device that is inflated for deployment towards a driver from a rotational center of a steering wheel at a driver's seat, and a passenger airbag that is inflated for deployment towards a passenger's seat from an instrument panel, are used for restraining the body of an occupant when, for example, an automobile collides.

In recent years, an airbag device has already been proposed (refer to, for example, Japanese Unexamined Patent Application Publication No. 2002-37011) to overcome the following. That is, when a serious accident that applies a large external force to an automobile occurs, for example, overturning of a vehicle body, resulting from a collision, or falling of a heavy object, such as a tree, a shock may be due to the shock generated during the serious accident.

In the aforementioned related art, the following basic structure is discussed. That is, an airbag, formed of a bag member in which base cloths are joined to each other, is accommodated in a backrest (or a headrest) of a seat of a vehicle, and the airbag is inflated by supplying a pressure fluid from an inflator in an emergency, to deploy the airbag towards the upper side of the head of an occupant.

SUMMARY OF THE INVENTION

In optimizing an airbag device provided in the seat, it is necessary to increase stability and deployment speed in an inflation/deployment performance.

It is an object of the present invention to provide an effective technology that increases deployment speed and stability in an inflation/deployment performance of an airbag device provided in a seat.

To this end, a first invention provides a seat comprising a backrest covered with a skin cloth and including a cleavage portion at a predetermined portion of the skin cloth; an airbag formed of a bag member in which a base cloth is joined, the airbag being provided in an interior of the backrest so as to be deployed towards an upper side of the head of an occupant as a result of cleaving the cleavage portion during inflation; and a cleavage restricting member provided at the skin cloth so as to restrict a cleavage of the skin cloth at a portion other than the cleavage portion.

When supplying a pressure fluid to the airbag, first, inflation of the airbag is started in the interior of the backrest, and, during the inflation, the skin cloth that covers the backrest is pressed to cleave the cleavage portion. Then, the airbag is inflated towards the outside of the backrest through the opened cleavage portion, and is deployed towards the upper side of the head of the occupant. The airbag is formed so as to deployed at a predetermined disposition and in a predetermined order in an inflation/deployment process thereof, and is accommodated in the interior of the backrest by being folded in such a way as to be capable of being predeterminately deployed. The cleavage portion is provided with a proper length and at a proper position so as to be capable of being predeterminately deployed.

The present invention includes the aforementioned cleavage restricting member, so that, when the airbag cleaves the cleavage portion in the inflation/deployment process, it is possible to restrict excess cleavage of the skin cloth at portions other than the cleavage portion. Therefore, the airbag can be deployed in accordance with the predetermined deployment operations, that is, the stability of the inflation/deployment performance of the airbag device can be increased.

In addition, since the pressing force by the airbag can be concentrated only at the cleavage portion, the cleavage portion can be quickly cleaved, that is, the deployment speed of the inflation/deployment performance of the airbag device can be increased.

According to a second invention, in the first invention, an end of the cleavage restricting member is provided so as to substantially match an end of the cleavage portion.

This makes it possible to restrict tearing, serving as a source of excessive cleavage, in an end of the cleavage portion.

According to a third invention, in either the first invention or the second invention, the cleavage restricting member is provided near an/the end of the cleavage portion.

This makes it possible to restrict the occurrence of tearing in, in particular, an end of the cleavage portion that tends to become a source of excessive cleavage.

According to a fourth invention, in any one of the first to third inventions, the cleavage restricting member is provided at a stitch portion of the skin cloth.

This makes it possible to restrict cleavage in, in particular, the stitch portion of the skin cloth that tends to be cleaved.

According to a fifth invention, in any of the first to fourth inventions, a damping layer is provided at an inner side of the skin cloth, and the cleavage restricting member is provided at the damping layer.

This makes it possible to also restrict cleavage of the damping layer, so that the absorption performance of shock applied to the occupant can be maintained, thereby making it possible to increase safety.

According to the present invention, it is possible to increase deployment speed and stability in an inflation/deployment performance of an airbag device provided in a seat.

DETAILED DESCRIPTION OF THE PREFERRED EMBODIMENTS

An embodiment of the present invention will hereunder be described with reference to the drawings.

Figure 1:
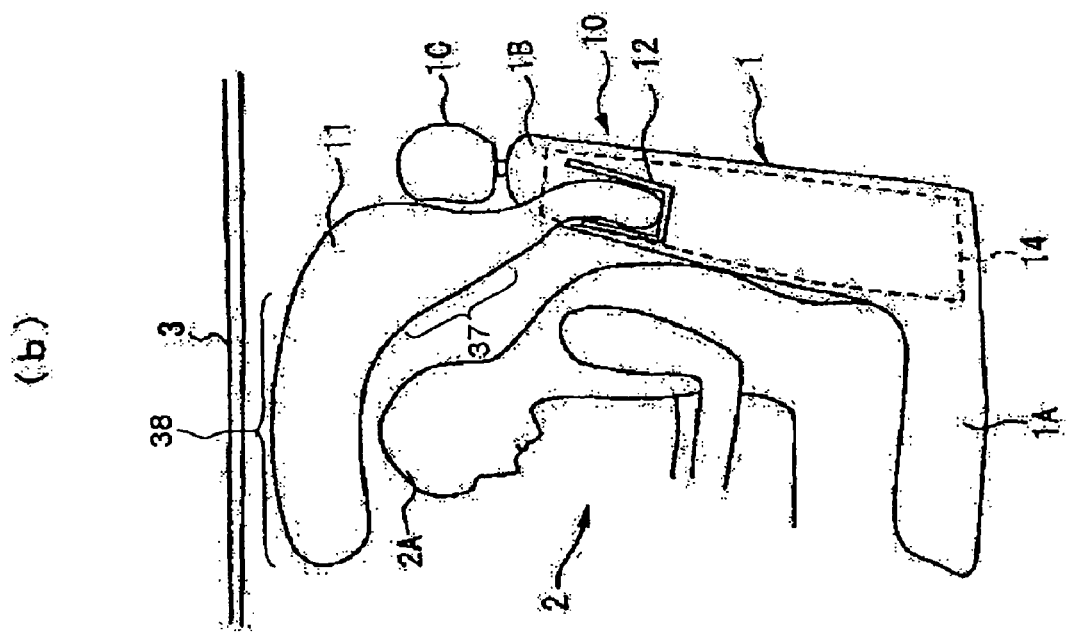
FIG. 1 is a schematic side view for when a seat according to an embodiment of the present invention is installed in an automobile.
Figure 1:
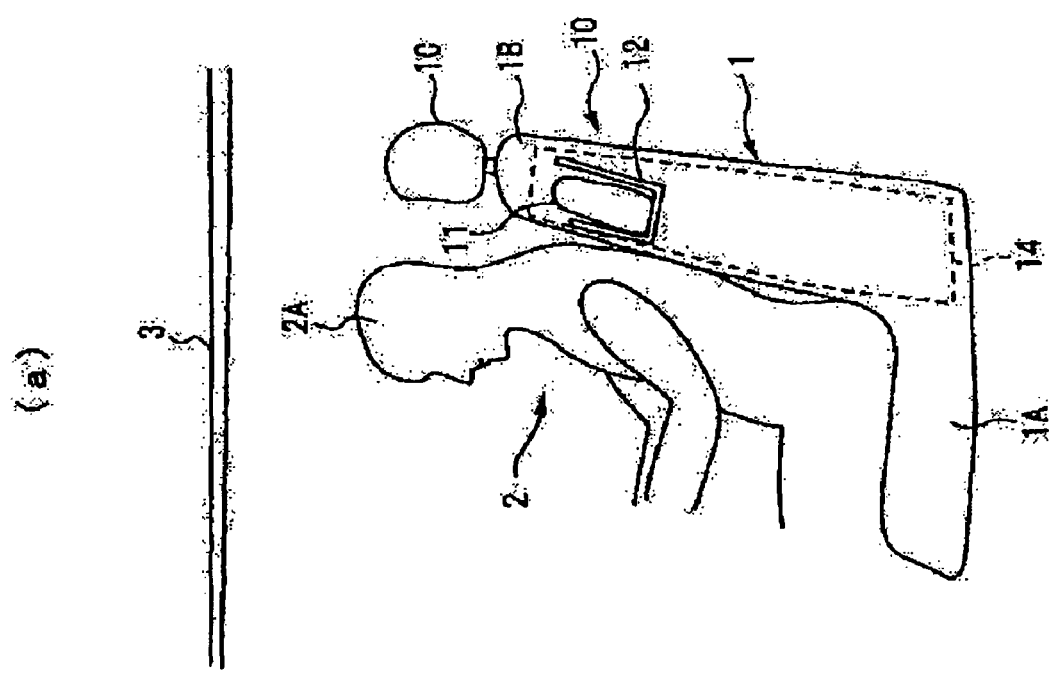

FIG. 1 is a schematic side view of when a seat 1 according to an embodiment of the present invention is installed in an automobile, with FIG. 1(*a*) showing a normal state and FIG. 1(*b*) showing a state when an airbag is being inflated. In the following description, a forward direction is a direction in which an occupant 2 seated on the seat 1 faces the front, and a backward direction is a direction opposite thereto.

In FIG. 1, the occupant 2 is seated on the seat 1. The seat 1 includes a sitting portion 1A, and a backrest 1B that protrudes upward from the sitting portion 1A. A headrest 1C is mounted to the top portion of the backrest 1B.

In the seat 1, an airbag device 10 for restraining a head 2A of the occupant 2 when, for example, a vehicle body is overturned due to an accident is installed in the interior of the backrest 1B. The airbag device 10 includes an airbag 11, a retainer 12, and an inflator 1. The airbag 11 comprises a bag member, formed by sewing and connecting a first base cloth 35 and a second base cloth 36 (refer to FIG. 4) to each other, and is provided so as to be deployed towards the upper side of the head 2A of the occupant 2 when the airbag 11 is inflated. The retainer 12 accommodates the airbag 11 in a folded state. The inflator 13 supplies gas (pressure fluid) for inflating and deploying the airbag 11 (refer to FIGS. 2 and 3).

The seat 1 includes in its interior a seat frame (strength supporting member) 14 including side plates 14A (refer to FIG. 2) and a cross member 14B (refer to FIG. 2), and forming the skeleton of the seat 1. The retainer 12 and the inflator 13 are provided at the seat frame 14 (described in detail below). The entire sitting portion 1A and the entire backrest 1B of the seat 1 are covered with a skin cloth 1D. A tear line (cleavage portion) 41, which tends to tear compared to other portions, is formed by a perforated line along a horizontal straight line in a front top portion of the skin cloth 1D covering the backrest 1B. A foam layer 42, which is a damping layer, is provided at the inside surface (at the inner side of the backrest 1B) of the skin cloth 1D. Further, a reinforcement cloth (cleavage restricting member) 43 is adhered around the tear line 41 at the inside surface of the foam layer 42 (refer to FIGS. 5 and 6).

Although not shown, various sensors that detect the occurrence of (or prediction of the occurrence of) overturning or collision (including side collision) of an automobile are provided in the automobile to which the airbag device 10 is installed. On the basis of detection signals from these sensors, an inflator controlling circuit (not shown) starts an initiator (not shown) of the inflator 13.

As shown in FIG. 1(*a*), in a normal state, the airbag 11 is accommodated in a folded state in the retainer 12. In contrast, when, for example, the automobile collides or is overturned as mentioned above, the sensors detect the collision or the overturning of the automobile, and a starting signal is input from the inflator controlling circuit to the initiator of the inflator 13, so that, as shown in FIG. 1(*b*), an upper deployment portion 38 of the airbag 11 is inflated, and is deployed between a roof 3 of the automobile and the head 2A of the occupant 2. At this time, the airbag 11 bulges outward after the tear line 41, formed in the skin cloth 1D of the backrest 1B, is cleaved, and is deployed towards the upper side of the head 2A of the occupant 2. Then, the airbag 11 is inflated so that the head 2A of the occupant 2 is pushed forward by the operation of a lower deployment portion 37 (refer to FIG. 1) of the airbag 11, causing the head 2A of the occupant 2 to bend forward, thereby making it possible to reduce a load on the neck. The consecutive deployment operations of the airbag 11 are set so that each portion of the airbag 11 is set so as to be inflated and deployed in a predetermined order and disposition. Accordingly, the shape of and the way in which the airbag 11 is folded in the retainer 12 are considered in accordance with this setting.

Figure 2:
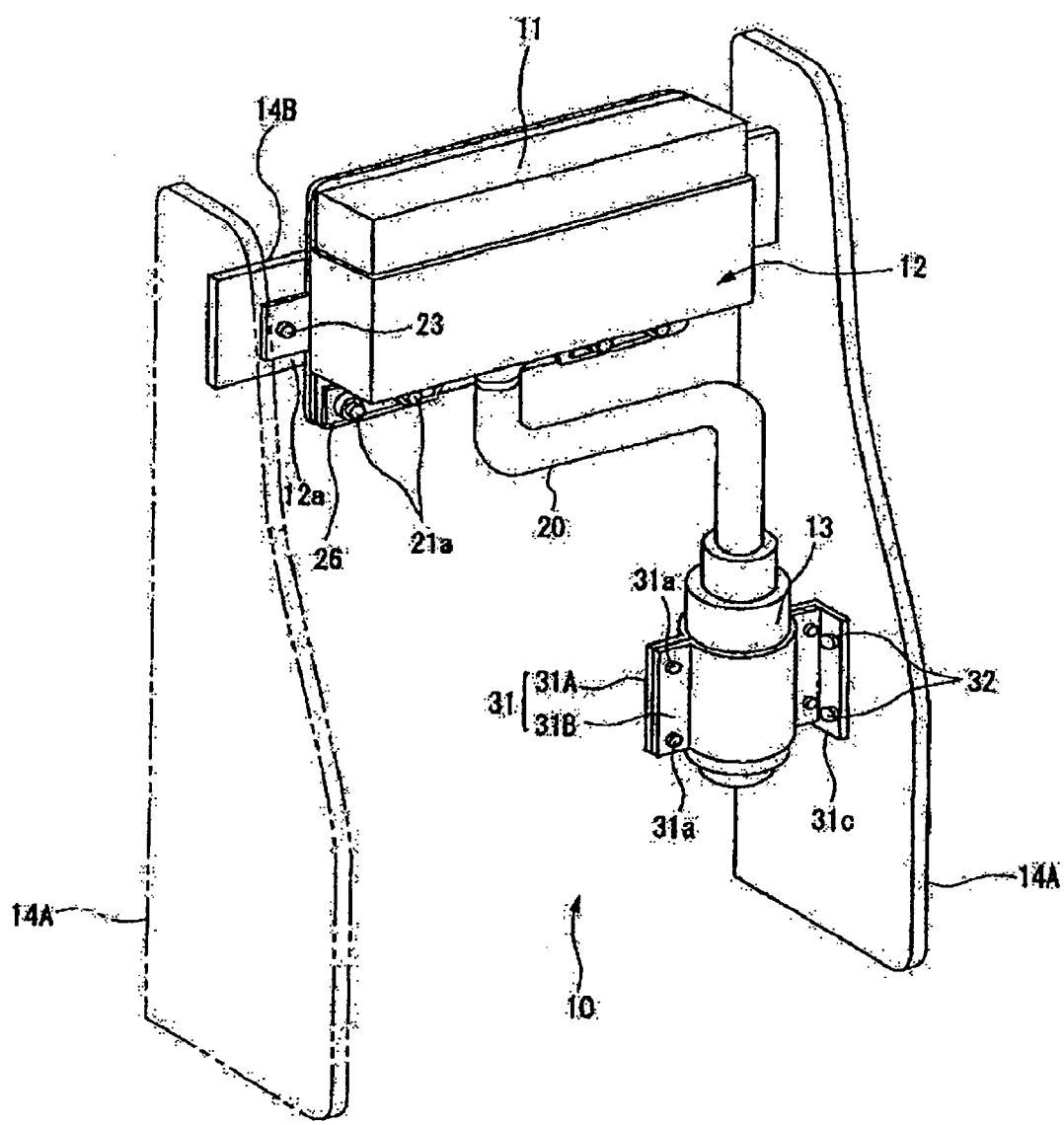
FIG. 2 is a perspective view showing a structure in which the airbag device of the seat according to the present invention is secured to a seat frame.
Figure 3:
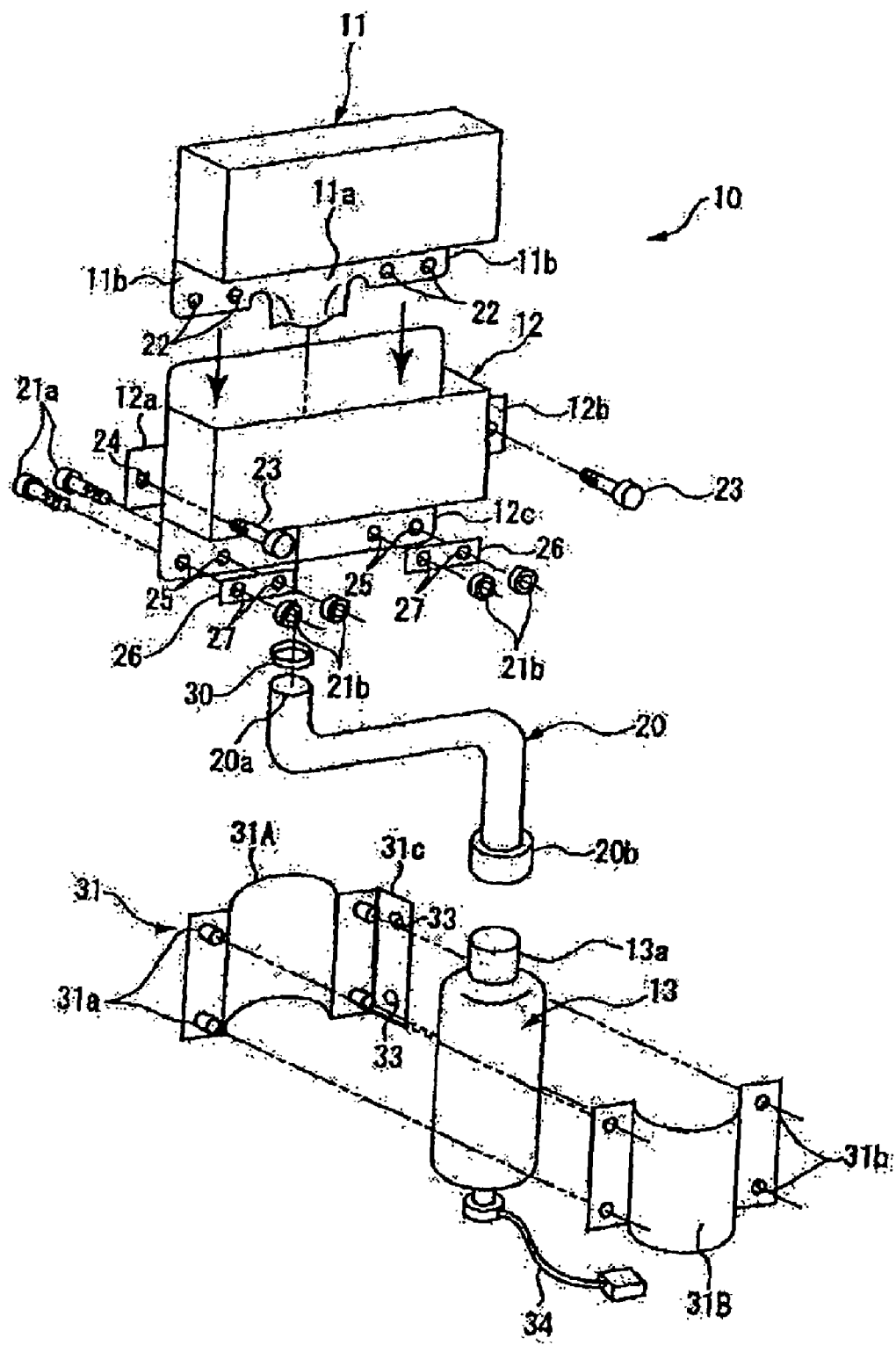
FIG. 3 is an exploded perspective view of the airbag device, showing the securing structure shown in FIG. 2 in more detail.

FIG. 2 is a perspective view showing a structure in which the airbag device 10 is secured to the seat frame 14. FIG. 3 is an exploded perspective view of the airbag device 10, showing in more detail the aforementioned securing structure.

In FIGS. 2 and 3, the seat frame 14 includes the pair of side plates 14A and 14A, provided at respective sides in a vehicle-width direction (that is, respective sides in a horizontal direction in FIG. 2) in the interior of the backrest 1B of the seat 1, and the cross member 14B, extending between the side plates 14A and 14A along substantially the vehicle-width direction and connecting the side plates 14A and 14A to each other. The side plates 14A and 14A and the cross member 14B are each provided in the interior of the backrest 1B of the seat 1. Although not particularly illustrated, the seat frame 14 includes a base plate provided in the interior of the sitting portion 1A.

A gas supply port 11*a*, connected to the inflator 13 through a pipe member 20, and mounting portions 11*b* and 11*b*, positioned at respective sides of the gas supply port 11*a*, are provided at a base-end side (inflator side, lower side in FIG. 3) of the airbag 11. Two bolt holes 22 each for inserting mounting bolts 21*a* for securing the airbag 11 and the retainer 12 to each other are formed at the mounting portions 11*b* and 11*b*, respectively. Mounting portions 12*a* and 12*b*, having bolt holes 24 for inserting mounting bolts 23 for securing the retainer 12, are formed at respective sides in the vehicle-width direction of the retainer 12. A mounting portion 12*c*, similarly having bolt holes 25 at positions corresponding to the positions of the bolt holes 22 of the airbag mounting portions 11*b*, is provided below (at the inflator side, lower side in FIG. 3) the mounting portions 12*a* and 12*b*.

While the airbag 11 is folded and accommodated in the retainer 12, the plurality of mounting bolts 21*a* (four in the embodiment) are inserted into the bolt holes 25 of the retainer mounting portion 12*c*, the bolt holes 22 of the airbag mounting portions 11*b*, and bolt holes 27, formed in mounting plates 26 at positions corresponding to the bolt holes 22 of the airbag mounting portions 11*b*; and are fastened with nuts 21*b*. This secures the airbag 11 to the retainer 12 while the airbag 11 is in a folded state. The mounting bolts 23 (two in the embodiment) are inserted into the bolt holes 24 of the retainer mounting portions 12*a* and 12*b*, and are, then, fastened to fastening holes (not shown) provided in the cross member 14B. This secures the retainer 12, in which the airbag 11 is accommodated in a folded state, to the cross member 14B.

The pipe member 20 is, for example, a metallic pipe that is bent at a plurality of locations (two locations in the embodiment), and is provided below the retainer 12. The pipe member 20 and the airbag 11 are connected to each other by covering a bag-side end portion 20*a* of the pipe member 20 with the gas supply port 11*a* of the airbag 11, and by caulking and securing them to each other with, for example, a metallic clamp band 30. The pipe member 20 and the inflator 13 are connected to each other by covering a top end portion 13*a* of the inflator 13 with a connection portion 20*b*, provided at an inflator-side end portion of the pipe member 20, and by adhering (or, for example, welding) them to each other. Accordingly, the airbag 11 and the inflator 13 are connected to each other through the pipe member 20.

The inflator 13 is provided further below the pipe member 20, and is mounted to one of the side plates 14A (on the right side in the vehicle-width direction in the embodiment) with a mounting member 31. The mounting member 31 includes a pair of mounting plates 31A and 31B that support the inflator 13 as a result of being placed on both sides of the inflator 13. These mounting plates 31A and 31B are connected to each other using rivets by inserting a plurality of rivets 31a (four in the embodiment), formed at the mounting plate 31A, into a plurality of rivet holes 31b (four in the embodiment), formed in corresponding positions of the mounting plate 31B, so that the mounting plates 31A and 31B are secured to each other as a result of being placed on both sides of the inflator 13. A mounting portion 31c is formed on one side (on the right side in the vehicle-width direction) of the mounting plate 31A so as to be bent by substantially 90 degrees. A plurality of mounting bolts 32 (two in the embodiment) are inserted into respective bolt holes 33, formed in the mounting portion 31c, and are fastened to respective fastening holes (not shown) of the side plate 14A, so that the mounting member 31 is secured to the side plate 14A. As a result, the inflator 13 is secured to the side plate 14A through the mounting member 31.

The initiator (not shown) of the inflator 13 and the aforementioned inflator controlling circuit (not shown) are connected to each other with a cable 34, so that an ignition control of the inflator 13 is carried out through the cable 34.

Figure 4:
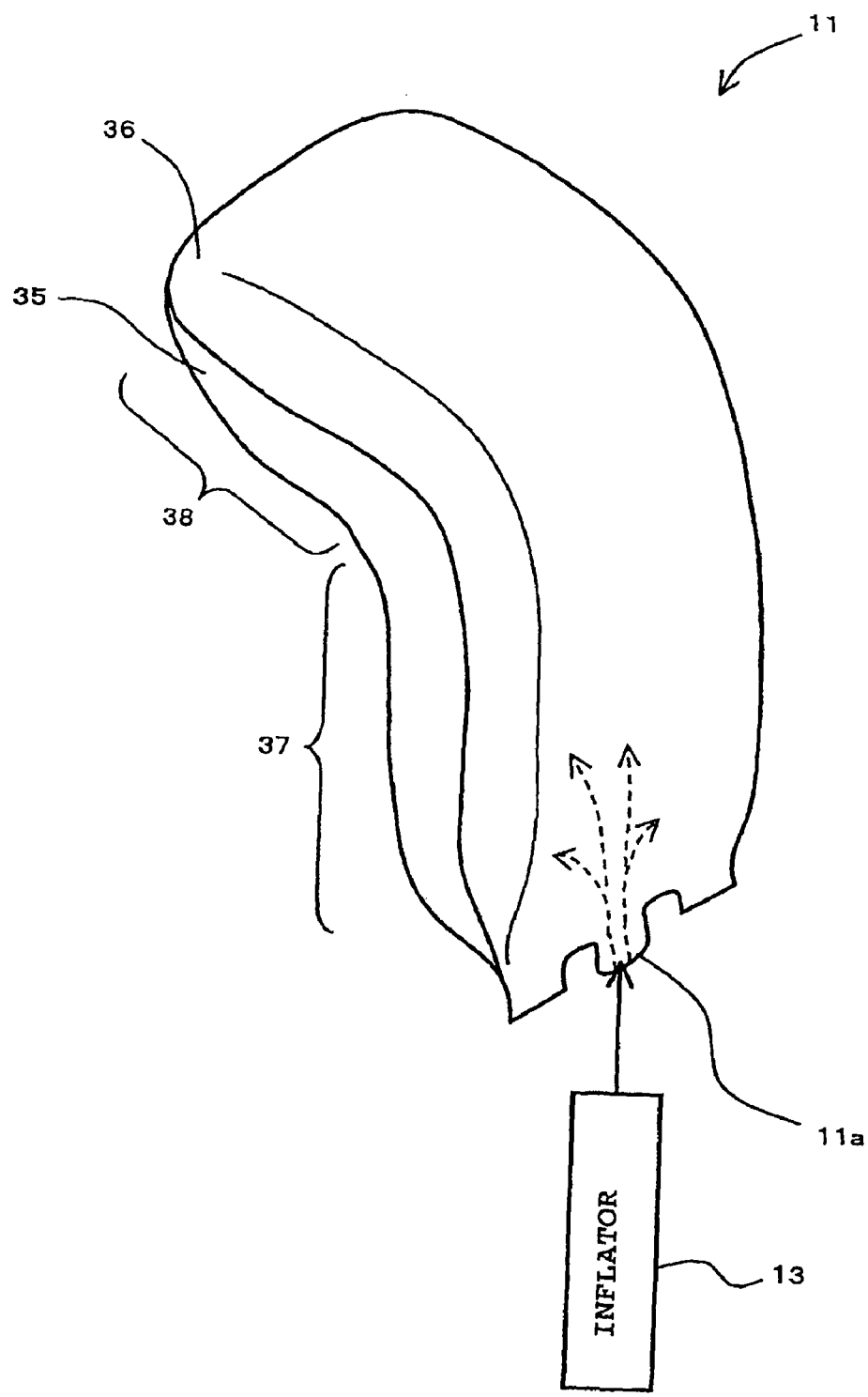
FIG. 4 is a perspective view of the entire structure of an airbag in a completely inflated and deployed state as seen obliquely from the back.

FIG. 4 is a perspective view of the entire structure of the airbag 11 in a completely inflated and deployed state as seen obliquely from the back.

In FIG. 4, the airbag 11 comprises the bag member formed by sewing and connecting the first base cloth 35 and the second base cloth 36 as mentioned above. When the airbag 11 is in an inflated and deployed state as illustrated, the airbag 11 has a shape in which the lower deployment portion 37 and the upper deployment portion 38 are integrally formed. First, pressure fluid is supplied to the gas supply port 11a from the inflator 13, so that the lower deployment portion 37 is inflated and deployed at a side opposing the back of the head of the occupant, causing the head of the occupant to be bent forward. Then, the upper deployment portion 39 is inflated and deployed towards the upper side of the head of the occupant.

Figure 5:
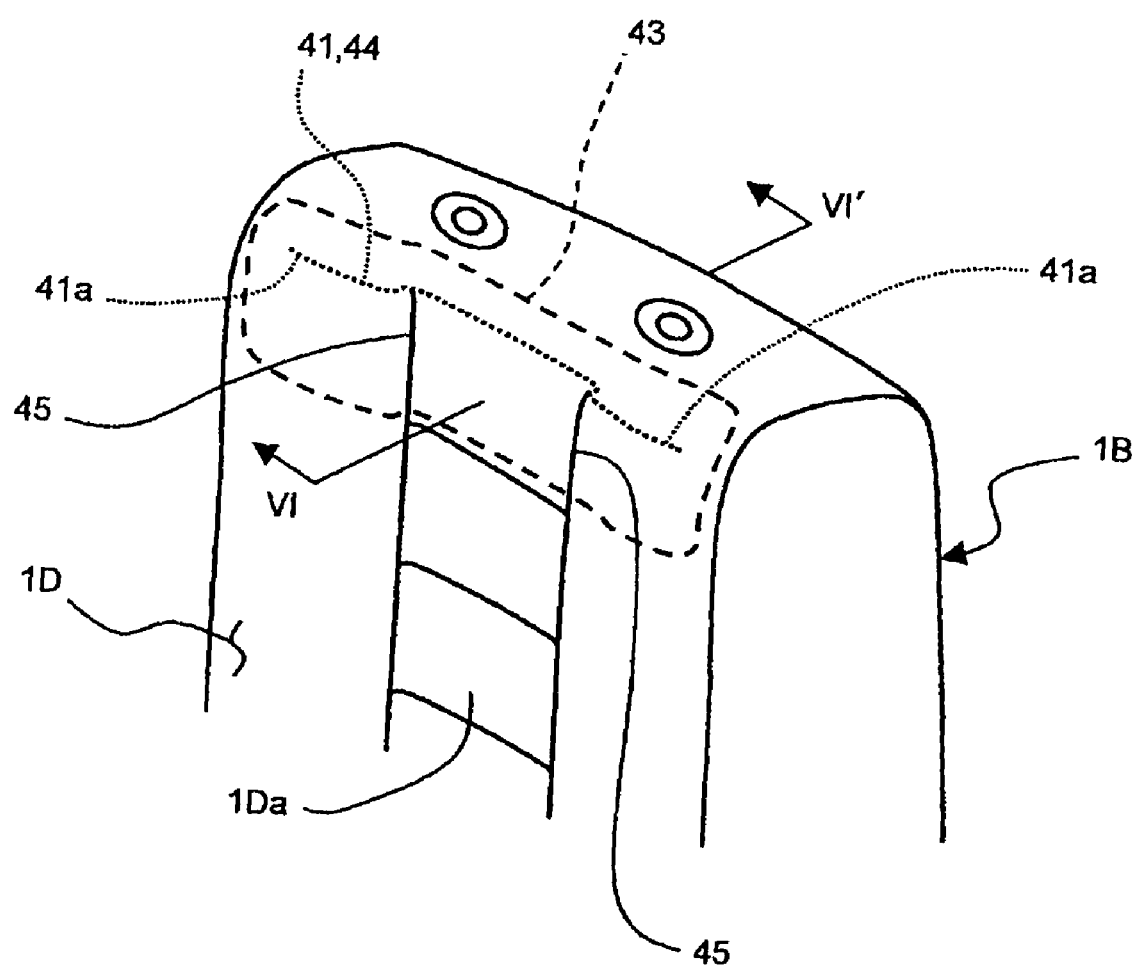
FIG. 5 is an enlarged perspective view of the vicinity of a tear line of a backrest as seen obliquely from the front side.
Figure 6:
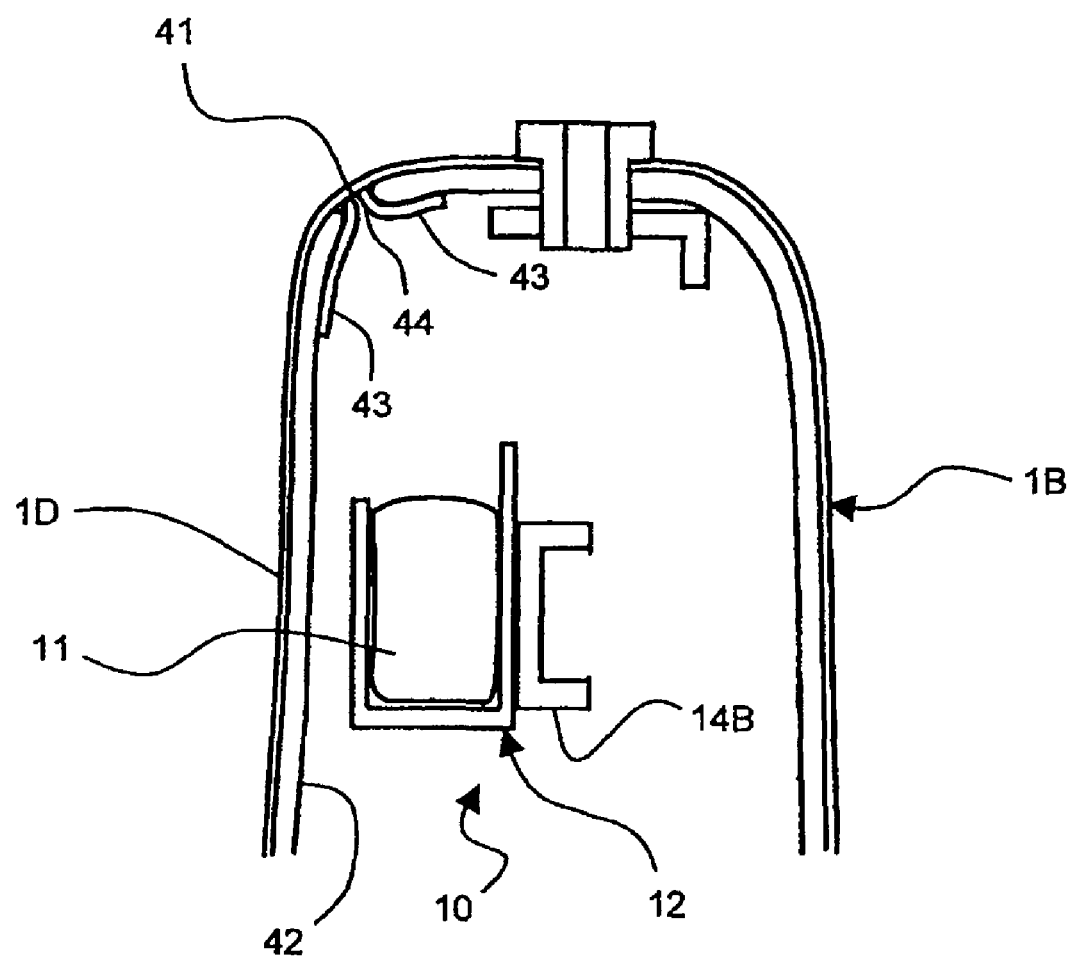
FIG. 6 is a sectional view of the backrest taken along line VI-VI' of FIG. 5.

FIG. 5 is an enlarged perspective view of the vicinity of the tear line 41 of the backrest 1B as seen obliquely from the front side. FIG. 6 is a sectional view of the backrest 1B taken along line VI-VI' of FIG. 5. To simplify the illustrations, the headrest is not shown in FIGS. 5 and 6.

In FIGS. 5 and 6, as mentioned above, the entire backrest 1B is covered with the skin cloth 1D, and the tear line 41 (a dotted line portion in FIG. 6), which tends to tear compared to other portions, is formed, in this embodiment, along a horizontal straight line in the front top portion (left front side in FIG. 5) of the backrest 1B among the portions of the skin cloth 1D by, for example, a perforated line. The length and disposition of the tear line 41 are set to a length and a disposition that allow the aforementioned predetermined deployment to be properly performed when it is pressed and cleaved at a suitable stage in an inflation/deployment process of the airbag 11 and, then, the airbag 11 bulges outward from the completely opened tear line 41. An ornamental cloth 1Da, in which design (esthetics) is considered, is sewed to the skin cloth 1D at the front side of the backrest 1B. A stitch portion 45 reaches the tear line 41. The stitch portion 45 is sewed so that the skin cloth 1D and the foam layer 42 at the inner side thereof are joined to each other.

The foam layer 42, which is a damping layer that is formed of, for example, a sponge sheet and that absorbs, for example, shock applied to an occupant, is provided at the inside surface (at the inner side of the backrest 1B) of the skin cloth 1D. Further, the reinforcement cloth 43 (a broken line portion in FIG. 6), formed of a material that has a high tensile strength and that does not break easily, is adhered to around the tear line 41 at the inside surface of the foam layer 42. The foam layer 42 and the reinforcing cloth 43 are integrally provided with the inside surface of the skin cloth 1D. Slits 44 whose lengths and locations match those of the tear line 41 of the slit cloth 1D are formed at both the foam layer 42 and the reinforcing cloth 43.

Open ends of the slit 44 of the reinforcing cloth 43 are adhered, for example, by using an adhesive or by welding to the inside surface of the skin cloth 1D so as to match open ends of the tear line 41 that has been cleaved. Since the length (length in the vehicle-width direction) of the entire reinforcing cloth 43 is sufficiently longer than that of the tear line 41, the reinforcing cloth 43 is adhered to where it overlaps the entire tear line 41, including both ends 41a, and the stitch portion 45 at the vicinity of the tear line 41. The reinforcing cloth 43 increases breakage strength of the foam layer 42 and the skin cloth 1D at the vicinity of the tear line 41 while maintaining breakage property at the tear line 41.

The seat 1 according to the embodiment having the above-described structure provides the following advantages.

That is, in the seat 1 according to the embodiment, providing the reinforcing cloth 43 can restrict excessive cleavage of the skin cloth 1D at portions other than the tear line 41 when the airbag 11 cleaves the tear line 41 in the inflation/deployment process of the airbag 11. Therefore, the airbag 11 can be deployed in accordance with the deployment operations carried out on the basis of the predetermined order and disposition. That is, the stability of the inflation/deployment performance of the airbag device 10 can be increased.

Since the pressing force by the airbag 11 can be concentrated at only the tear line 41, the tear line 41 can be quickly cleaved. That is, the deployment speed in the inflation/deployment performance of the airbag device 10 can be increased.

A reinforcing cloth 43 may be provided at locations other than where the reinforcing cloth 43 overlaps the entire tear line 41 and the vicinity thereof unlike in the embodiment. For example, a reinforcing cloth 43 may be provided at a location far away from the tear line 41 where the airbag 11 may press the skin cloth 1D (foam layer 42) in a concentrated manner and cause it to be cleaved during the inflation and deployment. Even in this case, escape of excessive pressing force of the airbag 11 caused by cleaving portions other than the tear line 41 can be restricted, so that the deployment speed and stability in the inflation/deployment performance of the airbag device 10 can be increased.

In the embodiment, by providing the open ends of each slit 44 of the reinforcing cloth 43 so as to substantially match the open ends of the tear line 41, the production of a cleavage, which is a source causing progression of excessive cleavage at the open ends of the tear line 41, can be restricted.

In addition, in the embodiment, providing the reinforcing cloth 43 near the ends 41a of the tear line 41 can restrict the production of a cleavage at the ends 41a of the tear line 41, which tends to be a source causing excessive cleavage.

Further, in the embodiment, providing the reinforcing cloth 43 at the stitch portion 45 of the skin cloth 1D makes it possible to restrict a cleavage at, in particular, the stitch portion 45 of the skin cloth 1D, which has low rupture strength and which tends to be cleaved.

In the embodiment, providing the reinforcing cloth 43 at the inside surface of the foam layer 42 makes it possible to also restrict a cleavage of the foam layer 42. Therefore, it is possible to maintain the capability of absorbing shock applied to an occupant in, for example, a collision of a vehicle, and to increase stability.

Although, in the embodiment, the reinforcing cloth 43, formed of a cloth material and serving as a cleavage restricting member provided at portions other than the tear line 41, is provided, the present invention is not limited thereto. For example, a reinforcing plate, formed of a material having a high strength, such as a metal or ceramic, may be provided, for example, in particular, near the ends 41a of the tear line 41 whose rupture strength needs to be increased.

Although, in the embodiment, the structure in which the airbag device 10 is provided in the interior of the backrest 1B is described, the prevent invention can be applied to a structure in which the airbag device 10 is provided in the interior of the headrest 1C covered with the skin cloth 1D, and similar advantages can be provided.

The specific structure according to the above-described embodiment does not, strictly speaking, limit the content of the present invention. The details can obviously be variously changed in accordance with the gist of the present invention.

The invention claimed is:

1. A seat comprising:
    a backrest covered with a skin cloth and including a cleavage portion at a predetermined portion of the skin cloth, wherein the cleavage portion comprises a tear line formed in the skin cloth with the tear line having opposite ends and a predetermined length therebetween;
    an airbag provided in an interior of the backrest so as to be deployed towards an upper side of the head of an occupant as a result of cleaving the tear line during inflation; and
    a cleavage restricting member provided at the skin cloth so as to restrict a cleavage of the skin cloth at a portion other than the cleavage portion, wherein the cleavage restricting member comprises a reinforcement cloth having a slit formed therein with the slit having opposite ends and a predetermined length therebetween the same as the predetermined length of the tear line, and the reinforcement cloth being sized so that when adhered to the backrest, the slit ends and the tear line ends are at the same positions so that the slit and the tear line are coextensive with each other and the reinforcement cloth overlaps the entire length of the tear line to extend beyond the ends thereof for restricting cleavage of the skin cloth beyond the tear line ends.

2. The seat according to claim 1, wherein the reinforcement cloth is provided at a stitch portion of the skin cloth.

3. The seat according to claim 1, wherein a damping layer is provided at an inner side of the skin cloth, and the reinforcement cloth is provided at the damping layer.

* * * * *